United States Patent
Katouzian et al.

(10) Patent No.: US 10,740,866 B2
(45) Date of Patent: Aug. 11, 2020

(54) DETERMINING APPROPRIATE MEDICAL IMAGE PROCESSING PIPELINE BASED ON MACHINE LEARNING

(71) Applicant: International Business Machines Corporation, Armonk, NY (US)

(72) Inventors: Amin Katouzian, San Jose, CA (US); Anup Pillai, San Jose, CA (US); Chaitanya Shivade, San Jose, CA (US); Marina Bendersky, Cupertino, CA (US); Ashutosh Jadhav, Santa Clara, CA (US); Vandana Mukherjee, Mountain View, CA (US); Ehsan Dehghan Marvast, Palo Alto, CA (US); Tanveer F. Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 16/018,486

(22) Filed: Jun. 26, 2018

(65) Prior Publication Data

US 2019/0392547 A1    Dec. 26, 2019

(51) Int. Cl.
*G06T 1/20* (2006.01)
*G06K 9/32* (2006.01)
*G06T 7/00* (2017.01)
*G06N 20/00* (2019.01)

(52) U.S. Cl.
CPC ............... *G06T 1/20* (2013.01); *G06K 9/325* (2013.01); *G06N 20/00* (2019.01); *G06T 7/0012* (2013.01); *G06T 2207/20081* (2013.01)

(58) Field of Classification Search
CPC ..... G06T 1/20; G06T 2207/10; G06T 7/0012; G06T 2207/20081; G06N 20/00
See application file for complete search history.

(56) References Cited

U.S. PATENT DOCUMENTS

| | | | |
|---|---|---|---|
| 6,011,862 | A | 1/2000 | Doi et al. |
| 7,783,094 | B2 | 8/2010 | Collins et al. |
| 7,894,653 | B2 | 2/2011 | Florin et al. |

(Continued)

OTHER PUBLICATIONS

Schlegl et al., "Predicting Semantic Descriptions from Medical Images with Convolutional Neural Networks", Proceedings of IPMI'15 (Year: 2015).*

(Continued)

*Primary Examiner* — Said M Elnoubi
(74) *Attorney, Agent, or Firm* — Stephen J. Walder, Jr.; William J. Stock

(57) ABSTRACT

Mechanisms are provided to implement an automated medical image processing pipeline selection (MIPPS) system. The MIPPS system receives medical image data associated with a patient electronic medical record and analyzes the medical image data to extract evidence data comprising characteristics of one or more medical images in the medical image data indicative of a medical image processing pipeline to select for processing the one or more medical images. The evidence data is provided to a machine learning model of the MIPPS system which selects a medical image processing pipeline based on a machine learning based analysis of the evidence data. The selected medical image processing pipeline processes the medical image data to generate a results output.

21 Claims, 5 Drawing Sheets

(56) References Cited

U.S. PATENT DOCUMENTS

| | | | |
|---|---|---|---|
| 8,538,770 | B2 | 9/2013 | Papier et al. |
| 8,655,036 | B2 | 2/2014 | Valadez et al. |
| 2003/0215119 | A1 | 11/2003 | Uppaluri et al. |
| 2008/0139920 | A1 | 6/2008 | Biglieri et al. |
| 2010/0274116 | A1 | 10/2010 | Blum et al. |
| 2019/0205606 | A1* | 7/2019 | Zhou .................... G06K 9/0014 |

OTHER PUBLICATIONS

U.S. Appl. No. 15/848,777, filed Dec. 20, 2017.

"3D Reconstruction", Stanford Medicine, National Biocomputation Center, http://biocomp.stanford.edu/3dreconstruction/software.html, accessed on the Internet Jan. 25, 2018, 32 pages.

"IBM Research—Cognitive Computing & Radiology for Heart Disease", YouTube, Dec. 14, 2016, 1 page.

Cheng, Beibei et al., "Graphical image classification combining an evolutionary algorithm and binary particle swarm optimization", Proceedings of SPIE 8297, Document Recognition and Retrieval, XIX, http://proceedings.spiedigitallibrary.org/proceeeding.aspx?articleid=1284047, Jan. 1, 2012, 9 pages.

Cole, Elizabeth et al., "Automatic Detection of Multiple Organs Using Convolutional Neural Networks", https://pdfs.semanticscholar.org/f017/c72e5194071323220464455686aa35570175.pdf, Accessed via the Internet Jan. 23, 2020, 5 pages.

High, Rob, "The Era of Cognitive Systems: An Inside Look at IBM Watson and How it Works", IBM Corporation, Redbooks, Dec. 12, 2012, 16 pages.

Kalpathy-Cramer, Jayashree et al., "Automatic Image Modality Based Classification and Annotation to Improve Medical Image Retrieval", Medinfo 2007, https://dmice.ohsu.edu/hersh/medinfo-07-kalpathy.pdf, Aug. 2007, pp. 1334-1338

Katouzian, Amin et al., "Metric Hashing Forests", Special Issue in Medical Image Analysis 34, Dec. 2016, pp. 13-29.

Moeskops, Pim et al., "Deep Learning for Multi-Task Medical Image Segmentation Multiple Modalities", Medical Image Computing and Computer-Assisted Intervention—MICCAI, 2016, Part II, LNCS 9901, pp. 478-486, Cornell University Library, arXiv: 1704.03379v1 [cs.CV], Apr. 11, 2017, pp. 1-9.

Moradi, Mehdi et al., "A Hybird Learning Approach for Semantic Labeling of Cardiac CT Slices and Recognition of Body Position", 2016 IEEE 13th International Symposium on Biomedical Imaging (ISBI), Apr. 13-16, 2016, pp. 1418-1421.

Moradi, Mehdi et al., "Viewpoint Recognition in Cardiac CT Images", Functional Imaging and Modeling of the Heart (FIMH 2015), LNCS 9126, Jun. 2015, pp. 180-188.

Muller, Henning et al., "Creating a classification of image types in the medical literature for visual categorization", In Proceedings of SPIE—The International Society of Optical Engineering 8425:194, publications.hevs.ch/index.php/attachments/single/396, Feb. 2012, 12 pages.

Rastgarpour, Maryam et al., "The Status Quo of Artificial Intelligence Methods in Automatic Medical Image Segmentation", International Journal of Computer Theory and Engineering, vol. 5, No. 1, http://www.ijcte.org/papers/636-A20039.pdf, Feb. 2013, pp. 5-8.

Simpson, Matthew et al., "Text- and Content-based Approaches to Image Modality Detection and Retrieval for the ImageCLEF 2010 Medical Retrieval Track", CLEF 2010 LABs and Workshops, ceur-ws.org/Vol-1176-/CLEF2010wn-ImageCLEF-SimpsonEt2010.pdf, Jan. 2010, 10 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

DETERMINING APPROPRIATE MEDICAL IMAGE PROCESSING PIPELINE BASED ON MACHINE LEARNING

BACKGROUND

The present application relates generally to an improved data processing apparatus and method and more specifically to mechanisms for determining the appropriate medical image processing pipeline to be used to process medical images based on machine learning applied to medical image data and/or corresponding textual data.

Various medical imaging technologies have been developed to assist medical professionals in obtaining an understanding of a patient's anatomy and internal medical condition in a non-invasive manner or minimally invasive manner. For example, these medical imaging technologies include X-ray technology, computed tomography (CT) scan technology, magnetic resonance imaging (MRI) technology, positron emission tomography (PET) scan technology, sonography technology, etc. Medical images captured by such technology may have various different characteristics including the particular modality used, the mode used, the view, and the particular portion of the human body for which the medical images are captured.

Recently, there has been interest in providing computer aided mechanisms to assist with the analysis of such captured medical images, so as to alleviate the burden on human beings. For example, medical image segmentation, registration, and classification algorithms have been developed for analyzing the medical images and identifying anatomical structures present within the medical images. However, such algorithms are fixed algorithms that only operate on a specific type of medical imaging technology or specific characteristic of a collection of medical images being analyzed, e.g., only medical images captured using a specific mode or view.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions that are executed by the at least one processor to cause the at least one processor to implement an automated medical image processing pipeline selection system. The method comprises receiving, by the automated medical image processing pipeline selection system, medical image data associated with a patient electronic medical record, and analyzing, by a medical image analytics subsystem of the automated medical processing pipeline, the medical image data to extract first evidence data comprising characteristics of one or more medical images in the medical image data indicative of a medical image processing pipeline to select for processing the one or more medical images. The method further comprises providing the first evidence data to a machine learning model of the automated medical image processing pipeline selection engine, and selecting, by the machine learning model, a medical image processing pipeline based on a machine learning based analysis of the first evidence data. Moreover, the method comprises processing, by the selected medical image processing pipeline, the medical image data to generate a results output.

In another illustrative embodiment, a method is provided, in a data processing system comprising at least one processor and at least one memory, wherein the at least one memory comprises instructions that are executed by the at least one processor to cause the at least one processor to implement an automated medical image processing pipeline selection system. The method comprises receiving, by the automated medical image processing pipeline selection system, medical image data and text data associated with a patient electronic medical record, and analyzing, by a text analytics subsystem of the automated medical image processing pipeline selection system, the text data to extract first evidence and to determine whether the first evidence comprises hint text indicating a medical image processing pipeline to select for processing the medical image data. The method further comprises, in response to the text data not comprising hint text indicating a medical image processing pipeline to select, extracting, by a medical image analytics subsystem of the automated medical image processing pipeline selection system, second evidence comprising characteristics of one or more medical images in the medical image data indicative of a medical image processing pipeline to select. Moreover, the method comprises providing the first evidence and second evidence to a machine learning model of the automated medical image processing pipeline selection engine, and selecting, by the machine learning model, a medical image processing pipeline based on a machine learning based analysis of the first evidence and the second evidence. In addition, the method comprises applying, by the automated medical image processing pipeline selection system, the selected medical image processing pipeline to the medical image data to generate a results output.

In other illustrative embodiments, a computer program product comprising a computer useable or readable medium having a computer readable program is provided. The computer readable program, when executed on a computing device, causes the computing device to perform various ones of, and combinations of, the operations outlined above with regard to one or more of the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to one or more of the method illustrative embodiments.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
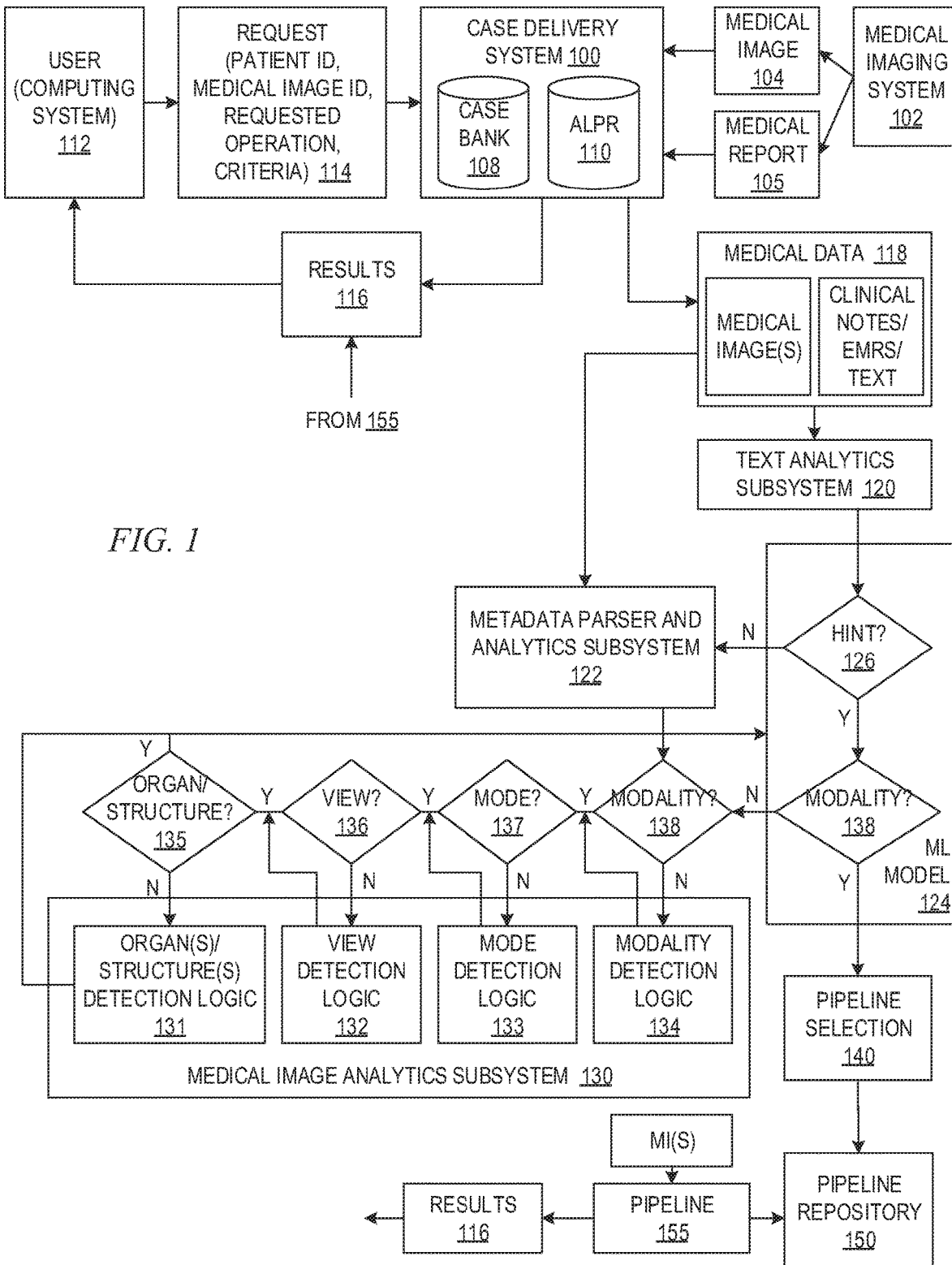
FIG. 1 is an example diagram illustrating an overview of a data flow of a system for automatic identification of a medical image analysis pipeline in accordance with one illustrative embodiment.

As noted above, medical imaging and automated computerized tools for applying algorithms to medical images to assist medical personnel in identifying internal anatomical structures of a patient have been developed. However, these computerized tools are limited in that they are fixed to a particular medical imaging technology, e.g., an algorithm may be specifically designed for application to medical images captured using a computed tomography (CT) scan medical imaging system. Thus, a user must specify which algorithm to apply to a particular medical image in order to obtain the benefit of the computerized assistance in "reading" the medical image and discerning the structures present in the medical image. However, this relies upon the user's knowledge and understanding which may result in an incorrect algorithm being specified by the user, or a non-optimal algorithm being specified for application to the medical image.

The illustrative embodiments provide mechanisms for applying machine learning to medical data, e.g., medical images, medical images and corresponding text, electronic medical records, and/or the like, to extract information from these sources of medical data to determine the most appropriate medical imaging pipeline, i.e. group of one or more medical image analysis algorithms, to apply to the particular medical images being processed, e.g., the most appropriate medical image segmentation, registration, and classification algorithms, as well as abnormality detection and disease detection algorithms. In accordance with one illustrative embodiment, these mechanisms include a text analytic subsystem, a metadata parser and analytic sub-system, a medical image analytic sub-system, and corresponding handshaking protocols facilitating the interaction of these sub-systems to corroborate extracted information. These sub-systems perform various analytics of different portions of the medical data, e.g., medical image data, text corresponding to the medical image data, metadata associated with the medical image data, patient electronic medical records (EMRs), and the like. The ultimate goal of these sub-systems is to identify evidence coming from the analysis of medical data by these sub-systems that relates to features of the medical image including, for example, image dimensionality, image modality, image modality mode, image modality view, imaging body part, imaging organ(s) or other anatomical structure(s), and targeted disease(s) or abnormality/abnormalities.

After identifying such evidence coming from the various sub-systems, the mechanisms of the illustrative embodiments determine what medical image analysis pipeline to utilize to process the medical image, so as to assist the medical professional. The mechanisms of the illustrative embodiments find the particular combination of models for performing a comprehensive analysis given the medical data for a specified purpose, such as disease identification, anomaly detection, treatment recommendation, or the like. The determination of such a medical image analysis pipeline, in some illustrative embodiments, may include the dynamic creation of such a medical image analysis pipeline, i.e. creation of a new medical image analysis pipeline, if one does not already exist that matches the determination.

Thus, the illustrative embodiments provide automated computer tools for automatically analyzing medical data to extract features that are then used to determine an appropriate pipeline of analytical models or algorithms for performing a comprehensive analysis of medical images to perform a desired operation, such as disease identification, anomaly detection, or the like. The illustrative embodiments alleviate the problems of utilizing fixed analytics that are limited to a single imaging technology and the problems associate with human based specification of the algorithm to utilize to analyze a medical image. Moreover, the illustrative embodiments provide automated mechanisms for addressing situations in which information regarding modality, mode, view, organ, and/or targeted disease/anomaly, for example, are not available for determining which analytics to utilize. The illustrative embodiments provide automated mechanisms for obtaining this unavailable information through analysis of the medical images themselves, associated medical reports, and the like, and then utilize this automatically discerned information to select appropriate analytics and/or algorithms/models for execution on the medical images.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for automatically determining, using machine learning, the most appropriate medical image processing pipeline to utilize when processing a medical image of a patient. The illustrative embodiments utilize various sub-systems for analyzing aspects of medical data, i.e. medical image data, medical text data corresponding to the medical image data, medical data present in patient electronic medical records (EMRs), and other metadata associated with the medical images, based on learned associations of extracted features that are indicative of various characteristics of the medical image. For example, the extracted features, extracted by the sub-systems, are utilized to answer such questions about the medical image as:

(1) What is the dimensionality (dim)? (e.g., 2D, 3D, 4D, etc.)
(2) What is the imaging modality (mod)? (e.g., MRI, CT, Echocardiogram, etc.)
(3) What is the mode of the imaging modality (mode)? (e.g., CTA, MRI, Ultrasound, PET, SPET, X-ray, CT, etc.)
(4) What is the imaging view (v)? (e.g., axial, sagittal, coronal, cross-sections, etc.)
(5) What is the body part (bp) or body region in the medical image? (e.g., chest, abdominal, whole body, etc.)
(6) What organs or other anatomical structures are present in the medical image (org)? (e.g., aorta, kidney, lungs, etc.)
(7) Are there any hints in the textual report accompanying the medical image or the patient EMR that indicates an answer to any of the above questions or any sign/symptoms related to targeted disease or anomaly?

In the absence of textual data, such as in the textual report accompanying the medical image or the patient EMR, the sub-systems of the illustrative embodiments extract the necessary information from the medical image data and its metadata to answer the above questions. Given some or all of the answers to the above questions, the mechanisms of the illustrative embodiments may determine a probability of a given disease or anomaly as a function of these answers, e.g., P(disease(s)|d; dim, mod, mode, v, bp, org, . . . ), where d is the medical data input analyzed by the sub-systems.

FIG. 1 is an example diagram illustrating an overview of a data flow of a system for automatic identification of a medical image analysis pipeline in accordance with one illustrative embodiment. The example illustrative embodiment shown in FIG. 1 is for automatically identifying a disease specific imaging analysis pipeline for analyzing the medical image to identify any diseases that may be represented in the medical image. The resulting identified disease specific imaging analysis pipeline may then be applied to the medical image to perform comprehensive analysis of the medical image and generate a decision support output that may identify potential diseases indicated in the medical image.

The illustrative embodiment shown in FIG. 1 assume that a medical image 104 is captured by the medical imaging system 102 using one of a plurality of possible medical imaging technologies, e.g., computerized tomography (CT) scan, X-ray, sonography, positron emission tomography (PET) scan, magnetic resonance imaging (MRI), etc. A human subject matter expert (SME), such as radiologist, sonographer, or specialist in one or more medical imaging technologies, may view the medical image(s) 104 and generate an electronic medical report document 105 detailing the SME's findings in the medical image 104. The electronic medical report document 105 may be generated via textual input from the SME, via a voice recording with speech-to-text translation, or the like. The electronic medical report document 105 comprises terms, phrases, and the like, that describe medical concepts represented in the corresponding medical image 104, e.g., measurements, etc. and/or specific references to features or portions of the medical image 104.

The captured image(s) 104 and corresponding electronic medical report document 105 may be stored in the case delivery system 106 as part of case bank 108 and Analytics Longitudinal Patient Record (ALPR) 110. The ALPR 110 is a database of patient information with respect to IDs, imaging studies, and reports. The case bank 108 stores the relevant patient cases within it. Any raw data relevant to the case with respect to a given patient is fetched from the ALPR 110 and the results of text or image processing are stored back into the ALPR 110 for the same patient.

The case delivery system 106 may further obtain additional information for patients from other electronic medical record sources, such as doctor office computing systems, hospital/clinic computing systems, pharmacy computing systems, medical insurance company computing systems, and the like (not shown). The case delivery system 106 responds to requests for access to patient medical information and is a primary source for medical data upon which the mechanisms of the depicted illustrative embodiment operates to determine the disease specific imaging pipeline to use to analyze medical images associated with a patient of interest.

As noted above, the case delivery system 106 stores a plurality of "cases", where a "case" is a collection of medical data for a particular patient. The medical data may comprise medical image data 104 and corresponding report documentation 105 from one or more medical imaging systems 102 as part of one or more medical image studies (a medical image study may comprise a plurality of individual medical images taken in a series), and may further include other electronic medical records (EMRs) obtained from a variety of sources of such medical information about the patient. This information may be correlated based on a patient identifier that uniquely identifies the patient from other patients.

Assuming the presence of medical data for a patient in the case delivery system 106, as shown in FIG. 1, a user 112, such as a medical professional, medical image specialist, clinician, or other authorize user requests medical data and processing of medical images associated with a specified patient. The request 114 may specify a patient identifier to unique identify for which patient the user 112 wishes to obtain the medical data and medical image processing output. Based on the patient identifier in the request 114, the case delivery system 106 may perform a lookup operation to retrieve the corresponding medical data. The case delivery system 106 serves as a medical data repository from which medical data corresponding to patients may be retrieved for presentation to the user 112 and for further processing, such as by way of processing medical images in the medical data according to one or more illustrative embodiments as described herein.

Thus, based on a requested medical image processing operation specified in the request 114, e.g., identify any diseases/anomalies present in the medical image study from date/time, the retrieved medical image data in the retrieved medical data may be processed in accordance with the mechanisms of the illustrative embodiments. The results 116 of such medical data retrieval from the case delivery system 106 and the processing of medical images in accordance with the mechanisms of the illustrative embodiments may be returned to the user 112. It should be appreciated that the user 112 may be a computing system associated with the user 112 which is used to interact with the case delivery system 106.

The retrieved medical data 118 may comprise various clinical notes, medical images, clinical values, and the like, obtained from the case bank 108 and ALPR 110 entries corresponding to the patient ID specified in the request 114. Portions of this retrieved medical data 118 are processed by the text analytic subsystem 120, medical image metadata parser and analytic subsystem 122, and medical image analytic subsystem 130. One or more handshake protocols may be provided for facilitating interactions between these subsystems so as to corroborate extracted information.

As a general overview, the text analytic subsystem 120 provides natural language processing (NLP) logic for processing natural language text and extracting evidence related to the medical image characteristics corresponding to the medical image(s) that are requested to be processed, e.g., evidence for answering the above questions (1)-(7), such as the characteristics dim, mod, mode, v, bp, and/or org. The medical image metadata parser and analytic subsystem 122 processes metadata associated with the medical image(s) to extract evidence representing medical image characteristics, such as evidence in support of answers to one or more of the above questions (1)-(7). For example, the metadata associated with the medical image(s) may comprise Digital Imaging and Communications in Medicine (DICOM) header information and the subsystem 122 may parse and analyze the DICOM header information to extract DICOM tags specifying one or more of the characteristics dim, mod, mode, v, bp, and/or org. It should be appreciated that while, in some situations, the text and/or metadata may specifically identify the particular characteristics, in other instances the values of such characteristics may need to be deduced from a more complex machine learning based evaluation of various evidence data extracted from the text/metadata in order to correlate such information to determine a value for a characteristic. For example, while the metadata associated with the medical image may specify the modality of the medical image to be a CT medical image, other evidential data from the accompanying report, e.g. dosage information, may provide evidence that the CT medical image has a mode of CTA, for example, as will be discussed in greater detail hereafter.

In addition to the text analytics and the metadata parsing and analytics applied by the subsystems 120 and 122, medical image analytics subsystem 130 provides additional logic for applying various machine learning and analytics algorithms to the medical image data itself to extract evidence indicative of answers to one or more of the previously indicated questions (1)-(7), i.e. to extract evidence of the characteristics of the medical image which may be indicative of the type of disease or abnormality specific imaging pipeline to apply to the medical image data. The medical image analytics subsystem 130 may comprise logic engines 131-134 for detecting different characteristics of the medical image specifically based on the analysis performed on the medical image data itself, e.g., logic engines 131-134 for analyzing the medical image data to determine the modality, mode, view, organ(s) and/or other anatomical structure(s), etc. The operations of the various logic engines 131-134 may be instigated based on a determination 135-138 as to whether or not a machine learning model 124, based on analysis of the metadata by the medical image metadata parser and analytics subsystem 122 and/or analysis of the textual data extracted from the medical data 118 by the text analytics subsystem 120, has determined a value for the corresponding characteristics. If not, then the medical image analytics subsystem 130 may identify such values based on its analysis of the medical image data itself. Alternatively, if there is no metadata or textual data that is processed, then again, the medical image analytics subsystem 130 may determine such values of characteristics based on analysis of the medical image data.

The logic engines 131-134 may be implemented as various machine learning or image computing, e.g., bottom up segmentation, algorithms which operate to find the answers to the above questions (1)-(7) and thus, determine characteristics of the medical image(s) in the medical data 118. For example, the modality detection logic 134 may use an application-specific deep learning network, trained on a large number of medical images, to automatically detect the modality of the medical image(s) in the medical data 118 based on features extracted from the medical image data. Moreover, as another example, the organ(s) detection logic engine 131 may utilize content-based retrieval techniques to identify body parts.

In still other embodiments, all of the evidence from all three analytics subsystems may be combined by the machine learning model 124 to determine values for the characteristics, i.e. answers to the above questions (1)-(7) by evaluating all of the evidence in combination to determine values for the characteristics based on the evidential support for these values and inferential logic implemented by the various machine learning models and logic engines. For example, the machine learning model 124 may obtain extracted evidence from the metadata indicating that the medical image(s) are of the patient's torso region, the evidence extracted from the text analytics may indicate a type of cardiac anomaly identified by a SME, e.g., and organ and anatomical structure detection by the medical imaging analytics subsystem may indicate that only structures surrounding the patient's heart are shown in the image. Thus, from an evaluation of these portions of evidence, it can be determined that the imaging organ(s) characteristic of the medical image(s) is the cardiac region of the chest, which may indicate a particular disease specific imaging pipeline to utilize to further process the medical image(s) in the retrieved medical data 118.

It should be appreciated that the machine learning model 124 is trained through a supervised or semi-supervised machine learning process. Thus, the machine learning model 124, which may be implemented for example as one or more convolutional neural network or other machine learning model appropriate to the desired implementation, may be presented with training input comprising the various types of evidence input that may be used to determine which is then processed by the machine learning model to generate a vector output. The vector output may then be evaluated against a ground truth dataset indicating the correct vector output given the training input, and adjustments to the model's operational parameters are made, e.g., weights of internal nodes of the convolutional layers in a convolutional neural network, to reduce an error or loss function of the machine learning model. In some illustrative embodiments, the machine learning model 124 may be comprised of a plurality of machine learning models, or convolutional neural networks, for example, where each model/network operates to determine the value for one of the medical image characteristics, e.g., the answer to one of the questions (1)-(7) above.

In one illustrative embodiment, in operating on the evidence extracted from the medical data 118 by the subsystems 120, 122, and 130, the machine learning model 124 determines 126 whether there are hints as to the correct disease specific imaging pipeline to use to process the medical images(s) based on the evidence extracted by the text analytics subsystem 120. If there are hints in the text, i.e. key words, phrases, medical codes, etc., that provide a sufficiently high confidence that a specific disease type or category is associated with the medical image(s) 128 of the medical data 118, then a corresponding diseases specific imaging pipeline 140 is selected or generated. The corresponding disease specific imaging pipeline 140 is then applied 150 to generate results 116 of processing the medical image(s) of the medical data 118 which may then be returned to the user 112 as part of the results corresponding to the requested medical data access and processing.

If there are not hints in the extracted evidence from the text analysis performed by the text analytics subsystem 120 that indicate a particular disease type or classification associated with the medical image(s) of the medical data 118, then the medical image metadata parser and analytics subsystem 122 may operate on the medical data 118 to extract evidence that is then used to determine 135-138 whether the modality, mode, view, organ(s) or anatomical structure(s), and/or other characteristics of the medical image(s) in the medical data 118 are identified. With each determination, if the determination is that the corresponding values of the characteristics are not able to be determined from the metadata processing, then the medical image analytics subsystem 130 may analyze the medical image(s) data to determine the value for the characteristic.

The characteristic information is then returned to the machine learning model 124 which uses the characteristic information along with any hints from the text analytics to determine a disease type or classification identification for selecting a disease specific imaging pipeline. That is, the machine learning model 124, given all of the retrieved evidence from the various subsystems 120, 122, and 130, computes the probability P, e.g., P(disease(s)|d; dim, mod, mode, v, bp, org, . . . ), of particular disease types or classifications are the focus of the medical image(s) or can be identified in the medical image(s) of the medical data 118. These probability values may then be used to select one or more disease specific imaging pipelines 150 to process the medical image data and generate decision support results 116 to be provided to the user 112 in response to their request 114. The selected disease specific imaging pipeline(s) 140 is then used to retrieve the corresponding pipeline 150 and apply it to the medical image(s) in the medical data 118 to generate results 116 that are returned to the requesting user 112.

Figure 2A:
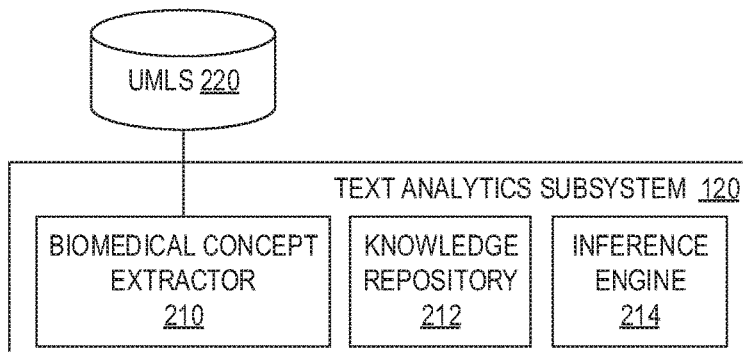
FIG. 2A is an example block diagram of logic components of a text analytics subsystem in accordance with one illustrative embodiment.
Figure 2B:
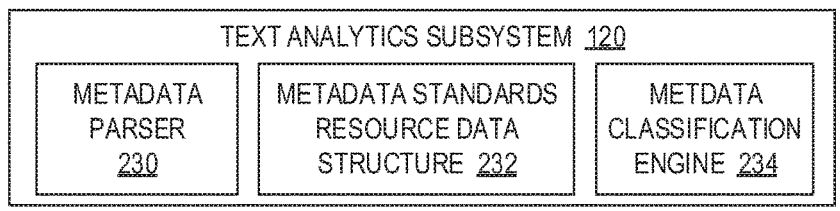
FIG. 2B is an example block diagram of logic components of a metadata parser and analytics subsystem in accordance with one illustrative embodiment.
Figure 2C:
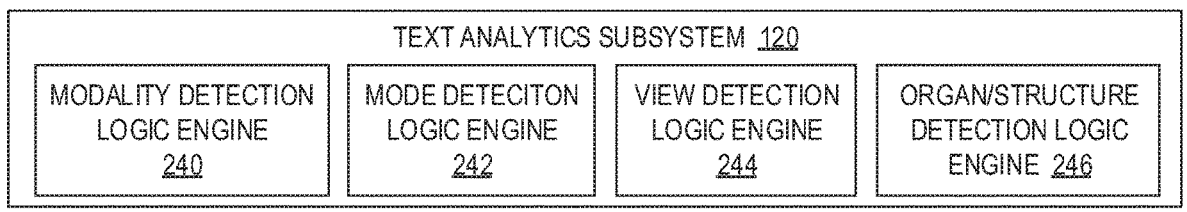
FIG. 2C is an example block diagram of logic components of a medical image analytics subsystem in accordance with one illustrative embodiment.
Figure 2D:
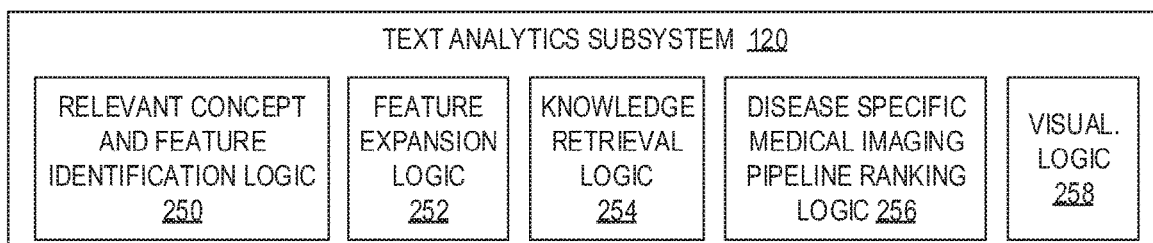
FIG. 2D is an example block diagram of logic components of the machine learning model in accordance with one illustrative embodiment.

FIGS. 2A-2D are example block diagrams illustrating logic components of the various subsystems 120, 122, and 130 and the machine learning model 124 in FIG. 1. FIG. 2A is an example block diagram of logic components of a text analytics subsystem 120 in FIG. 1 in accordance with one illustrative embodiment. FIG. 2B is an example block diagram of logic components of a metadata parser and analytics subsystem 122 in FIG. 1 in accordance with one illustrative embodiment. FIG. 2C is an example block diagram of logic components of a medical image analytics subsystem 130 in FIG. 1 in accordance with one illustrative embodiment. FIG. 2D is an example block diagram of logic components of the machine learning model 124 of FIG. 1 in accordance with one illustrative embodiment.

As shown in FIG. 2A, the text analytics subsystem 120 comprises a biomedical concept extractor 210, a knowledge repository 212, and an inference engine 214. The biomedical concept extractor 210 comprises logic for performing biomedical concept detection, which involves mapping words, phrases, medical codes, and other portions of text present in the medical data 118 to specific medical concepts, such as medical concepts identified in the Unified Medical Language System (UMLS). These concepts may be single-word or multi-word expressions such as "fever" or "heart failure." This identification of biomedical concepts is achieved by matching text, codes, etc. from the medical data 118 to terms, codes, etc. present in the UMLS database 220. The matching may be achieved, for example, using a string matching algorithm, code matching algorithm, ontology based matching algorithm, or the like. Various priorities may be provided so as to make determinations between multiple potential matches, e.g., giving priority to strings with the longest match, giving priority based on hierarchy in an ontology, or the like.

The concepts identified in the text, medical codes, etc. of the medical data 118 are then used to query the knowledge repository 212 to infer additional knowledge about these concepts. For example, upon identifying the concept "heart failure" as a biomedical concept in medical data 118, the knowledge repository 212 may be queried to provide additional information such as the symptoms, medications, and treatments for "heart failure." The knowledge repository 212 may be compiled from a variety of different sources of medical knowledge including, but not limited to, medical resource texts, e.g., physician desk references, pharmacological databases, natural language processing of medical publications, medical insurance guidelines, other treatment guideline documents, etc. The knowledge repository 212 preferable maps medical concepts to corresponding characteristics of diseases, anomalies, treatments, medications, and other characteristics associated with the medical concepts.

Using the identified medical concepts as determined from the biomedical concept extractor 210, and added information from the knowledge repository 212, the inference engine 214 computes a score for each candidate disease. In one illustrative embodiment, the inference engine 214 searches for relevant assertions for the source concepts. Every assertion is a weighted relationship between source and target concept. The weights for these relationships may be initially assigned by clinicians or other subject matter experts, but may be adjusted through a machine learning process over time. For example, chest pain is a sign and symptom for a heart attack and thus, may be given a weight of 1.0. In this example, chest pain and heart attack are the source and target concepts, respectively. Sign and symptom is the relationship between the two medical concepts, and the associated score of 1.0 is the weight given. Using these relationships and weight values, the scores for the candidate diseases are generated.

The scores for the candidate diseases are intermediate scores computed based on features from the text, and does not, at this time, consider evidence obtained from analysis of the medical image(s) themselves. The scores are generated based on the inference engine 214 applying a probabilistic approach to calculation of the scores based on knowledge evidence. For example, certain knowledge evidence, e.g., concepts belonging to sign and symptoms, have a higher weight in calculating the score as compared to other knowledge evidence, e.g., concepts belong to demographics.

A similar second score may be computed considering information obtained from metadata parsing and analysis performed by the metadata parser and analytics engine 122, and a similar third score may be computed considering information obtained from the analysis of the medical image(s) based on the processing by the medical image analytics subsystem 130. A final score for a candidate disease is may then be computed by combining these intermediate scores for text, metadata, and medical image feature evidence to then determine values for characteristics of the medical image(s) in the medical data 118.

As shown in FIG. 2B, the metadata parser and analytic subsystem 122 comprises a metadata parser 230, a metadata standards resource data structure 232, and a metadata classification engine 234. The metadata parser 230 provides logic for parsing the metadata associated with medical image(s) in the medical data 118 to identify separate types of metadata based on one or more standards for specifying metadata, as may be indicated in the metadata standards resource data structure 232. That is, the metadata parser 230 identifies portions of text in the metadata that are indicative of a separate section of metadata and then matches the text to metadata standards specified in the metadata standards resource data structure 232 to identify what the metadata indicates. The metadata classification engine 234 then classifies the metadata into classifications of characteristics of the medical image(s), e.g., modality, mode, view, organs/anatomical structures, etc. For example, the metadata associated with the medical image(s) in the medical data 118 may comprise Digital Imaging and Communications in Medicine (DICOM) header information and the metadata parser and analytic subsystem 122 may parse (via metadata parser 230) and analyze (via the matching with metadata standards resource data structure 232 and metadata classification engine 234) the DICOM header information to extract DICOM tags specifying one or more of the characteristics dim, mod, mode, v, bp, and/or org mentioned previously in association with questions (1)-(7).

That is, medical images belong to different modalities such as computerized tomography (CT), magnetic resonance imaging (MRI), X-rays, etc. The DICOM standard is widely used to store images across these modalities. The DICOM header has additional metadata associated with these images. This includes the image modality, image acquisition time, manufacturer of the imaging instrument, etc. While this information is useful, it lacks certain details. For example, while a CT scan is a commonly used modality in radiology, a variation in this modality is the CTA which involves injecting of a contrast media to aid visibility of blood vessels and tissues being studied. Differentiating between a CT and a CTA is non-trivial because both images fall under the modality CT in the DICOM header standard. It is however possible to infer that an image is a CTA by identifying the modality as CT and additional metadata such as dosage information of contrast. The metadata classification engine 234 may include a mode detection algorithm that develops a probabilistic score for each mode depending upon the presence of information across different fields in the DICOM header, e.g., a field specifying dosage is indicative of a CTA and not just a CT medical image.

As shown in FIG. 2C, the image analytic subsystem 130 comprises modality detection logic engine 240, mode detection logic engine 242, view detection logic engine 244, and organ/anatomical structure detection logic engine 246. It should be appreciated that these are only examples of the logic engines that may be included in the image analytic subsystem 130 as well as only examples of the possible characteristics of medical images that may be evaluated using the mechanisms of the illustrative embodiments. Other characteristics of medical images, as well as corresponding logic engines for detecting the values of such characteristics, may be used in addition to, or in replacement of, the characteristics and corresponding logic engines described herein without departing from the spirit and scope of the present invention.

The modality detection logic engine 240 comprises logic to identify the image data dimensionality by detecting image acquisition dimensions (ex. (x,y,z,t)). The modality detection logic engine 240 further comprises logic for determining the image data modality through machine learning, retrieval, and hashing techniques in supervised or unsupervised fashions. For example, a model (e.g., random forest model, convolutional neural network, support vector machine (SVM), ensemble trees, etc.) can be deployed after training using data comprised of different modalities (e.g., MRI, CT, Echocardiogram, PET, X-ray, etc.). Alternatively, supervised or unsupervised retrieval and/or hashing methods can be used to find similar matches to the medical image in the medical data 118 and then leverage information for detecting the underlying modality. Examples of methodologies for detecting the modality of an image, which may be implemented in some illustrative embodiments are described in the following documents: Katouzian et al., "Metric Hashing Forests," Special Issue in Medical Image Analysis 34, 13-29, 2016; Moradi et al., "A Hybrid Learning Approach for Semantic Labeling of Cardiac CT Slices and Recognition of Body Position," 2016 IEEE 13$^{th}$ International Symposium on Biomedical Imaging (ISBI), pp. 1418-1421; and Moradi et al., "Viewpoint Recognition in Cardiac CT Images," Functional Imaging and Modeling of the Heart (FIMH 2015), LNCS 9126, pp. 180-188, Springer. The results may also be used to further detecting the mode, view, organs/anatomical structures (i.e. body part), and disease type, for example.

Similarly, for mode detection logic engine 242, view detection logic engine 244, and organ/anatomical structure detection logic engine 246, these logic engines may be implemented by deploying machine learning, retrieval, and hashing techniques in supervised or unsupervised fashions. Again, a model (e.g., random forest, convolutional neural network, support vector machine (SVM), ensemble trees, etc.) can be deployed after training using data comprised of different modes (e.g., T1 MRI, T2 MRI, functional MRI, CTA, B-mode Echo, Doppler Echo, etc.) for the mode detection logic engine 242, different views (e.g., sagittal, coronial, axial, short axis, long axis) for the view detection logic engine 244, or different body part regions (e.g., CT chest, head, abdominal, whole body, etc.) for the organ/anatomical structure detection logic engine 246. Alternatively, supervised or unsupervised retrieval and/or hashing methods can be used to find similar matches to the medical image in the medical data 118 and then leverage information for detecting the underlying imaging mode, view, organs/anatomical structures.

As shown in FIG. 2D, the machine learning model comprises reasoning logic for identifying relevant targeted disease(s) that are associated with the medical image(s) in the medical data 118. This reasoning logic includes relevant concept and feature identification logic 250, feature expansion logic 252, knowledge retrieval logic 254, disease specific medical imaging pipeline ranking logic 256, and visualization logic 258. The relevant concept and feature identification logic 250 receives the concept extraction results from the processing by the biomedical concept extractor 210. However, not all the concepts identified by the biomedical concept extractor 210 are useful for reasoning and disease specific imaging pipeline identification. Therefore, the relevant concept and feature identification logic 250 identifies the most relevant concepts and features from the results generated by the biomedical concept extractor 210 for performing reasoning by the machine learning model 124 with regard to which disease specific imaging pipeline to select. For example, such relevant concepts and features may include specific symptoms, medications, treatments, the patients age, gender, requested processing of the medical image(s) indicated in the request 114, and negated concepts/symptoms, such as may be specified in the request 114 or otherwise indicated, e.g., the request may indicate to identify diseases indicated in the medical images but to ignore certain abnormalities (such as those that the physician is already aware of with the particular patient).

Once relevant concepts and features are identified, the feature expansion logic 252 expands the concepts and features with synonyms, related words, related ontological concepts, and the like. The operations of the feature expansion logic 252 assist with addressing vocabulary mismatch problems in which concepts from different sources (e.g., shortness of breath) may be represented differently than the representations of these concepts in the knowledge repository (e.g., dyspnea). For example, once relevant concepts are identified, e.g., shortness of breath, then the feature expansion logic 252 expands these concepts with their synonyms and related concepts, e.g., breathless, short of breath, difficult breathing, breathlessness, respiratory difficult, dyspnea, etc. The feature expansion logic 252 may leverage the biomedical knowledge, for example, from the Unified Medical Language System (UMLS).

The knowledge retrieval logic 254 retrieves relevant medical knowledge or clinical facts for all possible diseases relevant to the selection of a disease specific imaging pipeline based on the expanded concepts and features. The medical knowledge or clinical facts are retrieved from a knowledge repository or knowledge base that stores a collection of clinical facts that capture disease information, e.g., symptoms, demographics, etc. and differential diagnosis information, such as for example, shortness of breath: sign or symptom: aortic dissection. In the knowledge retrieval operation, the knowledge retrieval logic 254 retrieves relevant medical knowledge (clinical facts) for all possible diseases based on the expanded concepts and features. In one illustrative embodiment, the knowledge base comprises clinical facts (assertions) that correlate different medical concepts with diseases by way of specified relationships. For knowledge retrieval, or look-up, the knowledge retrieval logic 254 may query the knowledge base with original and expanded concepts and retrieve all the associated assertions in the knowledge base. For example, an original concept of "shortness of breath" may be expanded as above and then, during the knowledge retrieval, queries associated with "shortness of breath," "breathless," "short of breath," "difficult breathing," etc. are applied to the knowledge base and corresponding assertions are retrieved.

The disease specific medical imaging pipeline ranking logic 256 assesses clinical evidence based on the textual features for each of the targeted diseases as extracted by the text analytics subsystem 120, the metadata features extracted from the metadata by the metadata parser and analytics subsystem 122, and any medical image features extracted by the medical image analytics subsystem 130, and generates the probabilistic ranking of the possible imaging pipelines (target diseases). This may be done using a probabilistic function, such as the function P discussed above, where individual evaluations of the various characteristics of the medical image are evaluated to generate the probability value. In one example embodiment, the probabilities for different medical imaging pipelines are calculated based on scores calculated by the inference engine based on the clinical knowledge evidence. Based on the empirical study, clinicians' or subject matter experts' input, and/or machine learning, weights are assigned to different textual as well as imaging features, and these weights are applied by way of the probabilistic function to generate a probability value for the particular medical imaging pipeline.

The disease specific medical imaging pipeline ranking logic 256 identifies most probable disease(s) (final disease specific imaging pipeline selection). At this stage evidence based on text, metadata, and imaging features are available from the various subsystems 120, 122, and 130, and the disease specific medical imaging pipeline ranking logic 256 generates the probabilistic ranking of the possible target diseases and selects the diseases with the highest probability based on the evidence, e.g., diseases whose probability values are equal to or greater than a threshold probability value.

The visualization logic 258 provides a visualization of the operations performed by the machine learning model 124, e.g., the various logic of the machine learning model 124 shown in FIG. 2D, to assist with understanding the operations of the machine learning model. This visualization summarizes major steps taken by the machine learning model 124 to select the most probable diseases and associated disease specific imaging pipelines. The visualization may consolidate text and imaging concepts and features, provide details regarding the outcomes of intermediate reasoning operations from the various logic of the machine learning model, the weighting of evidence (clinical facts/assertions) for conclusions, and the basis for the selection of the most probable disease specific imaging pipelines, e.g., the probability calculations.

As noted above, the mechanisms of the illustrative embodiments implement a handshaking protocol to facilitate the interaction of the various subsystems and the machine learning model. The handshaking protocol may include a messaging mechanism for synchronization across the subsystems 120, 122, and 130. In one illustrative embodiment, this handshaking protocol may comprise, when evidence is found in one subsystem 120, 122, or 130, a notification being sent to the other subsystems 120, 122, or 130 for providing additional and/or complementary information to validate the new finding (evidence). For example, if the text analytics subsystem 120 detects that the imaging modality is CT from the textual evidence presented, then this is confirmed with the evidence coming from the medical image metadata parser and analytics subsystem 122, and this information is then relayed to machine learning model 124.

Moreover, in accordance with one illustrative embodiment, if no evidence is obtained from the text analytics subsystem 120, then the medical image metadata parser and analytics subsystem 122 is queried to see if any evidence can be obtained from analysis of the metadata. Depending on the evidence obtained from the subsystem 122, the following protocol is followed. First the protocol determines the modality, if it is not known, by executing modality detection logic 134 of the medical image analytics subsystem 130 and then relay this information to the machine learning model 124. After modality is obtained, the protocol determines mode, if it is not known, by executing a mode detection logic 133 of the medical image analytics subsystem 130 and then relay this information to the machine learning model 124. After modality and mode are obtained, the protocol detects the view, if it is unknown by executing the view detection logic 132 of the medical image analytics subsystem 130 and then relays this information to the machine learning model 124. After the above three characteristics of the medical image(s) are detected, the protocol detects the organ(s)/anatomical structure(s), if it/they are unknown by executing the organ/anatomical structure detection logic 131 of the medical image analytics subsystem 130 and then relays this information to the machine learning model 124. It should be appreciated that even though the above protocol has 4 stages, the information is relayed to the machine learning model 124 at every stage and if the evidence at this stage is sufficient for machine learning model 124 to determine a disease specific imaging pipeline 130 to be selected for processing the medical image(s) in the medical data 118, further processing by subsequent stages of the protocol need not continue.

The machine learning model 124 selects a disease specific imaging pipeline by ranking the disease specific imaging pipelines as mentioned previously. The pipeline is a collection of analytics algorithms applied to medical image data to extract information from the medical image data. Such analytics may include such operations as segmentation, registration, classification, disease detection, abnormality detection, etc. Thus, there may be separate pipelines defined for different combinations of analytics algorithms, and there may be multiple pipelines defined for the same disease identification, abnormality detection, modalities, modes, views, organs/anatomical structures, etc.

In ranking these disease specific imaging pipelines, candidate disease specific imaging pipelines may be retrieved from a pipeline repository 150 by searching descriptions of the various registered pipelines in the pipeline repository 150 based on the evidence extracted from text, metadata, and the medical image by the subsystems 120, 122, and 130, to find pipelines that have descriptions matching one or more of the extracted evidence factors, or characteristics of the medical image, e.g., answers to the questions (1)-(7) above. For example, in one illustrative embodiment, the inputs for this search are based on the concepts extracted by the text analytics subsystem 120, but may also include metadata evidence extracted by the metadata parser and analytic subsystem 122, if such is available. The pipeline search results are filtered to extract the most updated pipeline for each disease. For example, in the case where multiple pipelines exist for one particular disease, the most updated pipeline is selected on the basis of the timestamp associated with each of the multiple pipelines.

Furthermore, in one illustrative embodiment, if multiple imaging pipelines (aimed to analyze different diseases) exist for the same textual data, the imaging pipeline selected is that which minimizes the distance between the imaging pipeline name and description and the concepts extracted by the text analytic subsystem 120. (The distance that optimizes the search results is defined by the difference diff=2*queryLen−numMatches, where queryLen is the number of words of the textual data (length of the query) and numMatches is the number of words matched between the textual data (query) and the name and description of the candidate imaging pipeline (pipeline name and description are joined into a single textual phrase).

Once each search result is appropriately filtered, their final ranking is determined by comparison to concepts present in the evidence obtained from the text analytics, metadata analytics, and medical image analytics. For example, the disease specific imaging pipeline candidates are ranked according to the separate rankings based on the results of the text analytics subsystem 120, the metadata parser and analytic subsystem 122, and medical image analytic subsystem 130, and these rankings are taken as input when ranking the disease specific imaging pipelines 150 in the pipeline repository 150. In the general case, the final selected disease specific imaging pipeline 140 is that pipeline in the repository 150 which is ranked highest. In other illustrative embodiments, multiple pipelines may be selected from the repository, for the same or different diseases, based on the probability scores generated and their relationship to one or more threshold probability values, e.g., each pipeline whose probability is equal to or above a threshold probability value may be selected.

Having selected the pipeline(s) to be applied to the medical image(s) in the medical data 118, the medical image(s) data is input to the selected pipelines which process the medical image(s) data and generates results 116 which are then returned to the user 112, such as via the user's computing device. Examples of processing medical image(s) with, or without, accompanying textual medical image reports are described in co-pending and commonly assigned U.S. patent application Ser. No. 15/848,777, entitled "Automatic Contour Annotation of Medical Images Based on Correlations with Medical Reports", which is hereby incorporated by reference. The mechanisms described in this commonly assigned and co-pending U.S. Patent Application provide automatic contour annotation of medical images based on correlations with medical reports. With these mechanisms, an electronic medical report document associated with a medical image, or set of medical images, such as a medical imaging study, is input to a concept extractor to isolate key terms, phrases, descriptors, and other natural language content elements that references features of a medical image. The natural language processing performed by the concept extractor may be specifically configured for analysis of text with regard to medical imaging concepts and features of medical images. The natural language content elements, e.g., words, may then be embedded in a vector space. In one illustrative embodiment, the vector space is a glove vector space, where a glove is an unsupervised learning algorithm for obtaining vector representations for words. Training is performed on aggregated global word-word co-occurrence statistics from a corpus, and the resulting representations showcase interesting linear substructures of the word vector space.

With the mechanisms of this co-pending U.S. Patent Application, the series of vectors in the vector space are then fed-forward through a long short-term memory (LSTM) network which processes semantic and relational information in sentences. A long short-term memory (LSTM) network is a recurrent neural network (RNN) architecture that remembers values over arbitrary intervals.

In addition, the associated medical image may be processed by a convolutional neural network (CNN) which extracts features from the medical image and provides a vector output representing these extracted features. The processing of the medical image may be done in parallel to the processing of the medical report through the LSTM network.

The features from the CNN are concatenated with the output of the LSTM network and sent through a multi-layer perceptron (MLP). In machine learning, the perceptron is an algorithm for supervised learning of binary classifiers, i.e. functions that can decide whether an input (represented by a vector of numbers) belongs to one class or another. The perceptron is a type of linear classifier, i.e. a classification algorithm that makes its predictions based on a linear predictor function combining a set of weights with the feature vector. The final output layer of the multi-layer perceptron is a series of points for the contour of one or more abnormalities that is regressed using a mean squared error loss function.

The CNN operates as a descriptor generation engine and generates numerical values that are a descriptor of the medical image and which are represented as a vector output. The LSTM network receives textual data as an input from the medical report and converts the textual data input into a vector (vector embedding). Thus, the CNN provides a vector output representative of the medical image features and the LSTM network provides a vector output representative of the key terms, phrases, or other natural language content elements (hereafter assumed to be words for purposes of illustration).

A machine learning model, e.g., a multi-layer perceptron (MLP) in some illustrative embodiments of this co-pending U.S. Patent Application, is trained on these vector outputs together. For example, the training may involve inputting to the machine learning model, an input training medical image dataset where it is known, for each medical image in the dataset, what the coordinates are of the bounding region of where an abnormality exists within the input training medical image dataset, and where there is electronic textual data associated with the medical image, such as in an electronic medical report document accompanying or associated with the training medical image. For example, the medical image data for a medical image in the training medical image dataset may have metadata identifying the four vertex points of a polygonal region where an abnormality is present in the medical image, although other coordinates of more or less points of a bounding region (contour) of various configurations may be used depending on the desired implementation. The associated electronic text identifies medical concepts of abnormalities.

Through training, the vector representation of the medical images in the training medical image dataset and the vector representation of the associated electronic text is used to identify relationships between the two such that when similar text is found in other electronic text, e.g., electronic medical report documents, associated with other medical image data, similar regions of those medical images may be identified and annotated. Thus, for example, assume that there may be 256 numerical values in an output vector that describes a medical image and 256 numerical values that describe text. The machine learning model concatenates these and is trained to output the coordinates of points along a bounding region, e.g., 4 vertex points of a polygon, of a contour indicating a region where the abnormality specified in the text lies in the medical image.

It should be appreciated that these mechanisms of the co-pending U.S. Patent Application are only examples of the types of processing of medical images that may be performed by the selected pipelines in accordance with one or more illustrative embodiments and the illustrative embodiments are not limited to such. Rather, any known or later developed medical image processing pipeline may be used with the mechanisms of the illustrative embodiments without departing from the spirit or scope of the illustrative embodiments.

Thus, the illustrative embodiments provide mechanisms for selecting an appropriate medical image processing pipeline to be applied to one or more medical images in medical data associated with a patient. The selection of the medical image processing pipeline from a repository of such pipelines is based on machine learning of the characteristics of the medical images that are the target of the processing. These characteristics are extracted, by the various subsystems of the illustrative embodiments, from textual content associated with the medical images, metadata associated with the medical images, and/or analysis of the features of the medical images themselves. A machine learning model is provided that evaluates the evidence extracted by these various subsystems to determine probability scores associated with candidate pipelines indicative of a probability that the corresponding pipeline is an appropriate pipeline to perform a desired analysis of the medical image(s) and provide a desired result to a requesting user. These probabilities may be based on characteristics such as the modality of the medical image, the mode, the view, the organ(s)/anatomical structure(s), and the like. The probabilities may be used to rank pipelines relative to one another and then select one or more of these pipelines which are then applied to the medical image data to generate results that are returned to the requesting user via the computing device. Thus, rather than having to have a user specify which pipeline to utilize, which may be erroneous, and being limited to a single pipeline specifically configured for a particular medical imaging technology, the illustrative embodiments provide mechanisms for automatically selecting from a vast repository of pipelines, which pipeline(s) are the most appropriate to process a medical image to provide a desired result requested from a user.

Figure 3:
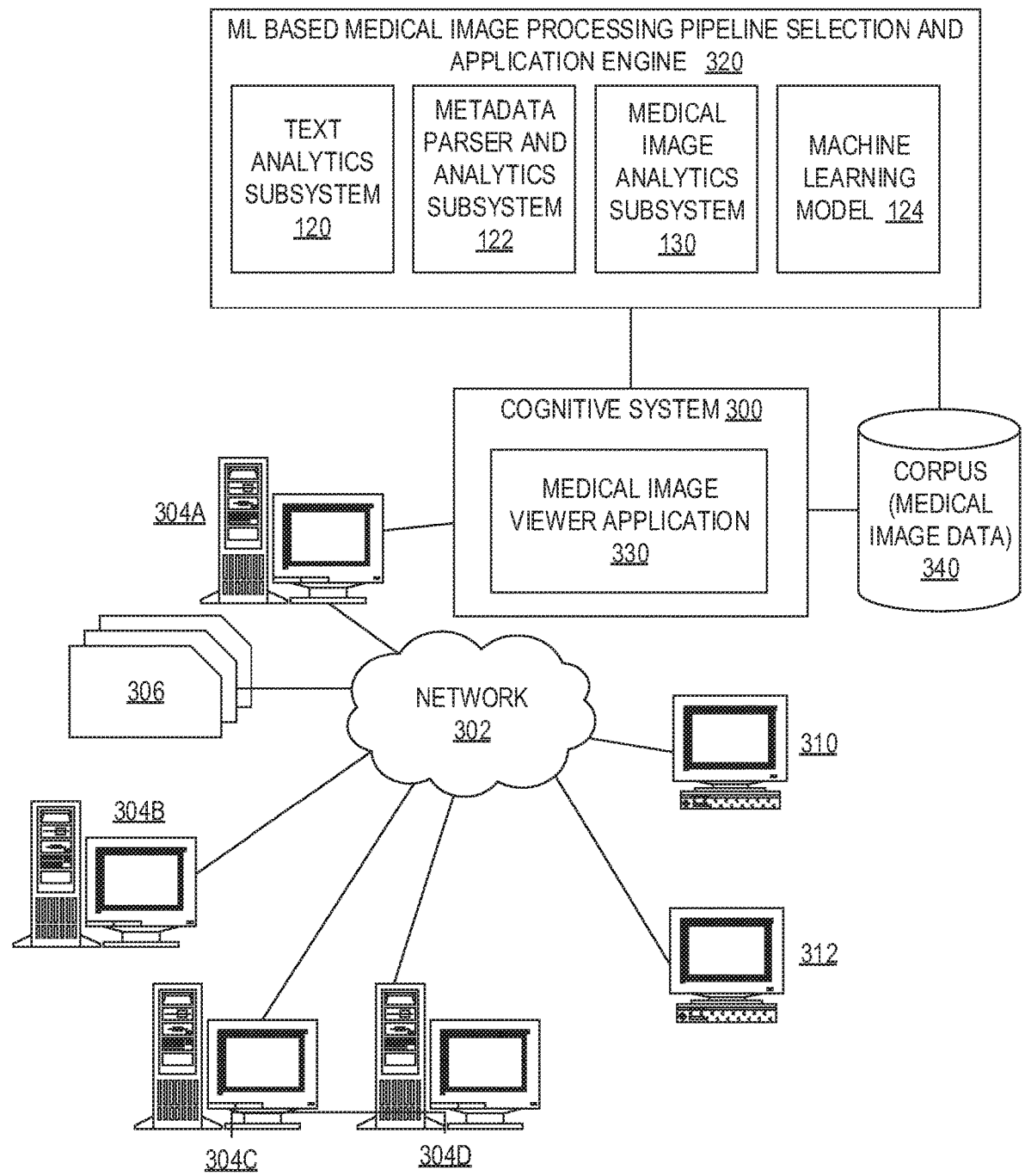
FIG. 3 is an example block diagram of a distributed data processing environment in which aspects of the illustrative embodiments may be implemented.

FIG. 3 depicts a schematic diagram of one illustrative embodiment of a cognitive system 300 implementing medical image viewer application 330, which in turn may represent the results of analyzing medical image data based on the operation of a machine learning based medical image processing pipeline selection and application engine 320. The medical image viewer application 330 and the machine learning based medical image processing pipeline selection and application engine 320, which may implement such subsystems 120, 122, 130, and machine learning models 124, case delivery system 100, and the like, described above with regard to FIG. 1, may be provided as part of the cognitive system 300 or may operate in conjunction with the cognitive system 300 which may respond to user provided requests for access to patient information and/or requests for processing of such patient information, which may include medical image data. In some illustrative embodiments, the cognitive system 300 may in fact be the case delivery system 100 in FIG. 1 in which further cognitive logic is provided for processing case data from the case bank 108 and ALPR 110, for example.

The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like.

In some illustrative embodiments, the cognitive system 300 and network 302 enables question processing and answer generation (QA) functionality for one or more cognitive system users via their respective computing devices 310-312. In other embodiments, the cognitive system 300 and network 302 may provide other types of cognitive operations including, but not limited to, request processing and cognitive response generation which may take many different forms depending upon the desired implementation, e.g., cognitive information retrieval, training/instruction of users, cognitive evaluation of data, such as medical imaging data, or the like. Other embodiments of the cognitive system 300 may be used with components, systems, sub-systems, and/or devices other than those that are depicted herein.

In some illustrative embodiments, the client computing devices 310 and 312 may be used as a mechanism for logging onto or otherwise accessing the cognitive system 300 for purposes of viewing medical imaging studies for patients and perform operations for classifying and/or corroborating automated classification of such medical imaging studies. For example, a doctor or other medical professional may utilize a client computing device 310 to access the services and functionality provided by the cognitive system 300 and a medical image viewer application 330 to view medical images of one or more medical imaging studies stored in the corpus 340 for one or more patients. The user of the client computing device 310 may view the medical images and perform operations for annotating the medical images, adding notes to patient electronic medical records (EMRs), and any of a plethora of other operations that may be performed through human-computer interaction based on the human's viewing of the medical images via the cognitive system 300. Moreover, in accordance with the mechanisms of the illustrative embodiments, the user of the client computing device 310, having specified a patient identifier for the medical images that are to be viewed, may further request or otherwise initiate an automated selection of a medical image processing pipeline to be applied to the medical image(s) so as to provide supporting information for assisting with decision making by the user. In such a case, the mechanisms of the illustrative embodiments may be invoked to automatically select the most appropriate pipeline(s) to apply to the medical images and generate results that may be returned to the user via their client computing device 310.

In some illustrative embodiments, the cognitive system 300 may be configured to implement a request processing pipeline that receive inputs from various sources. The requests may be posed in the form of a natural language question, natural language request for information, natural language request for the performance of a cognitive operation, or the like. For example, the cognitive system 300 may receive input from the network 302, a corpus or corpora of electronic documents 306, cognitive system users, and/or other data and other possible sources of input. In one embodiment, some or all of the inputs to the cognitive system 300 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

The request processing pipeline of the cognitive system 300 may comprises a plurality of stages for processing an input question/request based on information obtained from the corpus or corpora of data 306 and/or 340. For example, a doctor may input a question of the type "Where is the anomaly in Patient A's chest X-ray?" or may input a request of the type "Identify any anomaly in Patient A's chest X-ray." Alternatively, the question/request may be the selection, via a user interface of the like, of a particular operation to be performed by the cognitive system on a particular viewed medical image, such as may be viewed via the medical image viewer application 330. For example, the doctor may access a medical image associated with a patient and select an option to identify any anomalous regions in the medical image.

The pipeline generates answers/responses for the input question or request based on the processing of the input question/request and the corpus or corpora of data 306, 340. For example, the request to render the medical image, or to identify an anomalous region in the medical image, may invoke the operation of a machine learning based medical image processing pipeline selection and application engine 320 of the illustrative embodiments, which implements the various subsystems 120, 122, and 130 and machine learning model 124 as described in FIG. 1. Alternatively, the operation of the a machine learning based medical image processing pipeline selection and application engine 320 of the illustrative embodiments may be performed in response to new medical imaging data and corresponding electronic medical report documents being received, e.g., added to the corpus 340 and/or 306. In the latter case, the cognitive system 300 may perform a retrieval operation from the corpus 340 of the medical image data for performance of cognitive operations and/or rendering of the medical images via the medical image viewer application 330 the images being pre-processed based on an automatically selected pipeline(s) as determined by the mechanisms of the illustrative embodiments.

In some illustrative embodiments, the cognitive system 300 may be the IBM Watson™ cognitive system available from International Business Machines Corporation of Armonk, N.Y., which is augmented with the mechanisms of the illustrative embodiments described herein. More information about the pipeline of the IBM Watson™ cognitive system may be obtained, for example, from the IBM Corporation website, IBM Redbooks, as well as in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 3, the cognitive system 300 may operate in conjunction with a machine learning based medical image processing pipeline selection and application engine 320, in accordance with the mechanisms of the illustrative embodiments. The machine learning based medical image processing pipeline selection and application engine 320, and its various components 120, 122, 130, 124, may be implemented in specialized hardware, software executed on hardware, or any combination of specialized hardware and software executed on hardware. The machine learning based medical image processing pipeline selection and application engine 320 comprises a text analytics subsystem 120, a medical image metadata parser and analytics subsystem 122, a machine learning model 124, and a medical image analytics subsystem 130, as previously described with reference to FIG. 1. The machine learning based medical image processing pipeline selection and application engine 320 may further implement the handshake protocol previously described to facilitate the interaction of the various subsystems 120, 122, and 130, as well as the machine learning model 124. These various elements may further comprise sub-elements corresponding to the various logic modules and engines described previously with regard to FIG. 1, which operate in accordance with one or more of the illustrative embodiments described previously to facilitate automatic selection of one or more medical image processing pipelines, such as disease specific imaging pipelines.

The a machine learning based medical image processing pipeline selection and application engine 320 operates in the manner previously described above with reference to FIG. 1, where similarly named elements perform similar operations. Thus, for example, a doctor or other medical professional operating a client computing device 310 may log onto the cognitive system 300 and access a medical imaging study associated with a patient, such as from corpus 340, for example, such as by providing a request 114 specifying the patient identifier, a medical imaging study identifier (e.g., date/time, location, etc.), and possibly a requested medical image analysis operation to be performed (e.g., identify any chest anomalies) with corresponding filters or exclusions (e.g., do not include lung diseases). The medical imaging study may be generated by a medical imaging service provider using medical imaging equipment and may provide the medical imaging study data, comprising a plurality of medical images in a digital form, for storage in the corpus 340. The medical imaging study data and/or individual medical images, may have associated medical reports that are provided in an electronic form as well and may likewise be stored in the corpus 340 in association with the medical imaging study or medical image data. Moreover, the corpus 340 may store other electronic medical records (EMRs) of the patients which may comprise clinical notes, clinical values, medical codes, and other sources of medical knowledge about the individual patients that may be processed using natural language processing and the like.

The medical professional may submit a request to the cognitive system 300, such as via a graphical user interface (GUI) of the medical image viewer application 330, or the like, to view a medical image and have the cognitive system 300 perform a desired analysis of the medical image, e.g., identify anomalous regions within the medical image. Responsive to the request, the cognitive system 300, in processing the request via the request processing pipeline, may invoke the machine learning based medical image processing pipeline selection and application engine 320, which has already been trained, to automatically identify appropriate pipeline(s) for processing the medical image data to generate a requested result, where the automatic identification is based on the extracted characteristics of the medical image(s) as determined from associated text, metadata, and features of the medical image(s) as described previously. The automated contour annotation system 320 may process the medical image data retrieved from the corpus 340, as well as the electronic medical report document associated with the medical image data, patient EMR data, metadata associated with the medical image, and the like, in the manner previously described above with regard to FIG. 1, to thereby automatically identify and apply one or more medical image processing pipelines to the medical image data and generate corresponding results. The results may then be returned to the cognitive system 300 for representation in the medical image viewer application 330 so that the results may be used by the user of the client computing device 310 to assist with decision making.

As mentioned above, in an alternative embodiment, the operations of the machine learning based medical image processing pipeline selection and application engine 320 may be automatically invoked when new medical image data and medical report data are added to the corpus 340. For example, as a pre-processing operation when the medical image data is added to the corpus 340, the machine learning based medical image processing pipeline selection and application engine 320 may operate on the data to identify features in the medical image data indicative of various diseases which can then be provided to a user via the medical image viewer application 330. Thereafter, during runtime when the medical professional requests to view the medical image data, the results of the automated processing by the automatically selected pipeline(s) may be retrieved from the corpus 340 without having to then invoke the operations of the machine learning based medical image processing pipeline selection and application engine 320.

Thus, the illustrative embodiments provide mechanisms for automatically identifying the most appropriate medical image processing pipelines for processing a medical image, or medical image study, based on characteristics of the medical image(s) as determined from an analysis of associated text, metadata, and/or features of the medical image(s) themselves. This greatly reduces the amount of human effort and resources required to generate desired results of processing of medical images and avoids the inherent errors in reliance on human beings to identify which processing should be applied to medical images. Moreover, the mechanisms of the illustrative embodiments permit a large repository of potential medical image processing pipelines to be considered for processing medical images rather than being limited to a single pipeline specifically defined for a particular medical imaging technology and specified by a human user.

Figure 4:
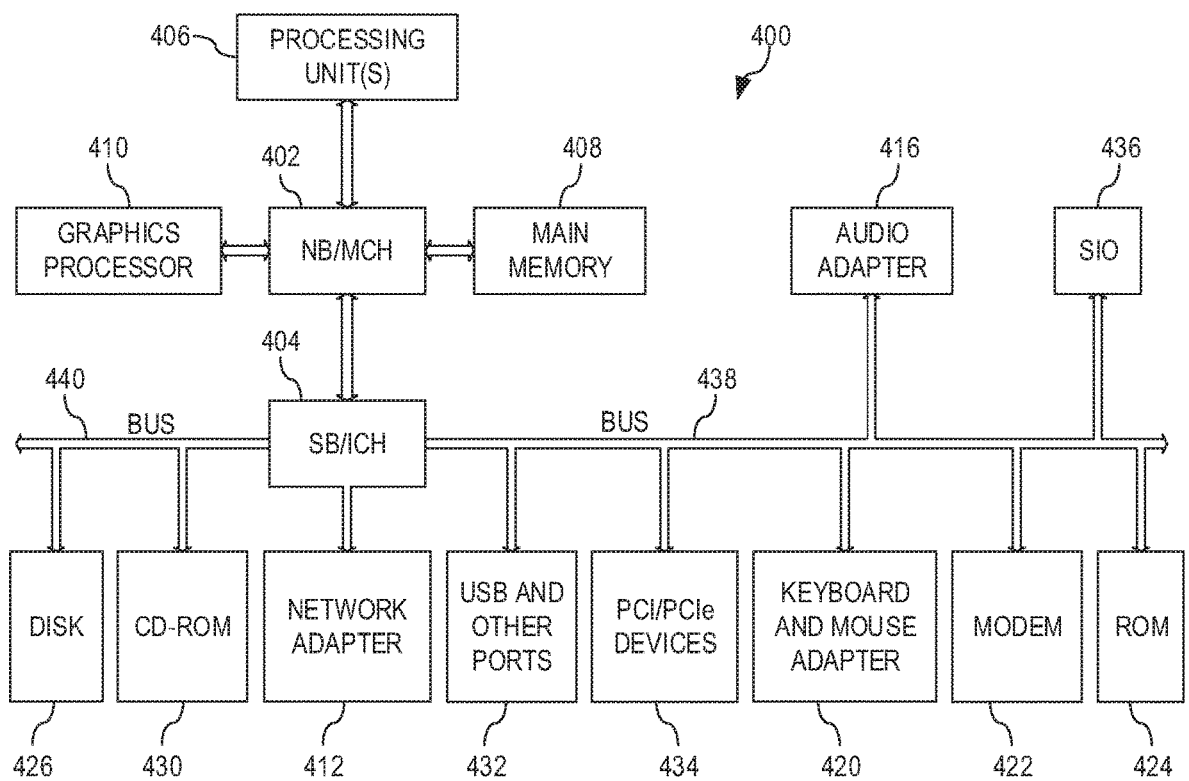
FIG. 4 is an example block diagram of a computing device/data processing system in which aspects of the illustrative embodiments may be implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as a server 304A-D or client 310-712 in FIG. 3, in which computer usable code or instructions implementing the processes for illustrative embodiments of the present invention are located. In one illustrative embodiment, FIG. 4 represents a server computing device, such as a server 304A, which, which implements a cognitive system 300 and medical image viewer application 330, where the server 304A further is specifically configured and executes hardware and/or software logic to implement the machine learning based medical image processing pipeline selection and application engine 320 described with reference to FIG. 3.

In the depicted example, data processing system 400 employs a hub architecture including North Bridge and Memory Controller Hub (NB/MCH) 402 and South Bridge and Input/Output (I/O) Controller Hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
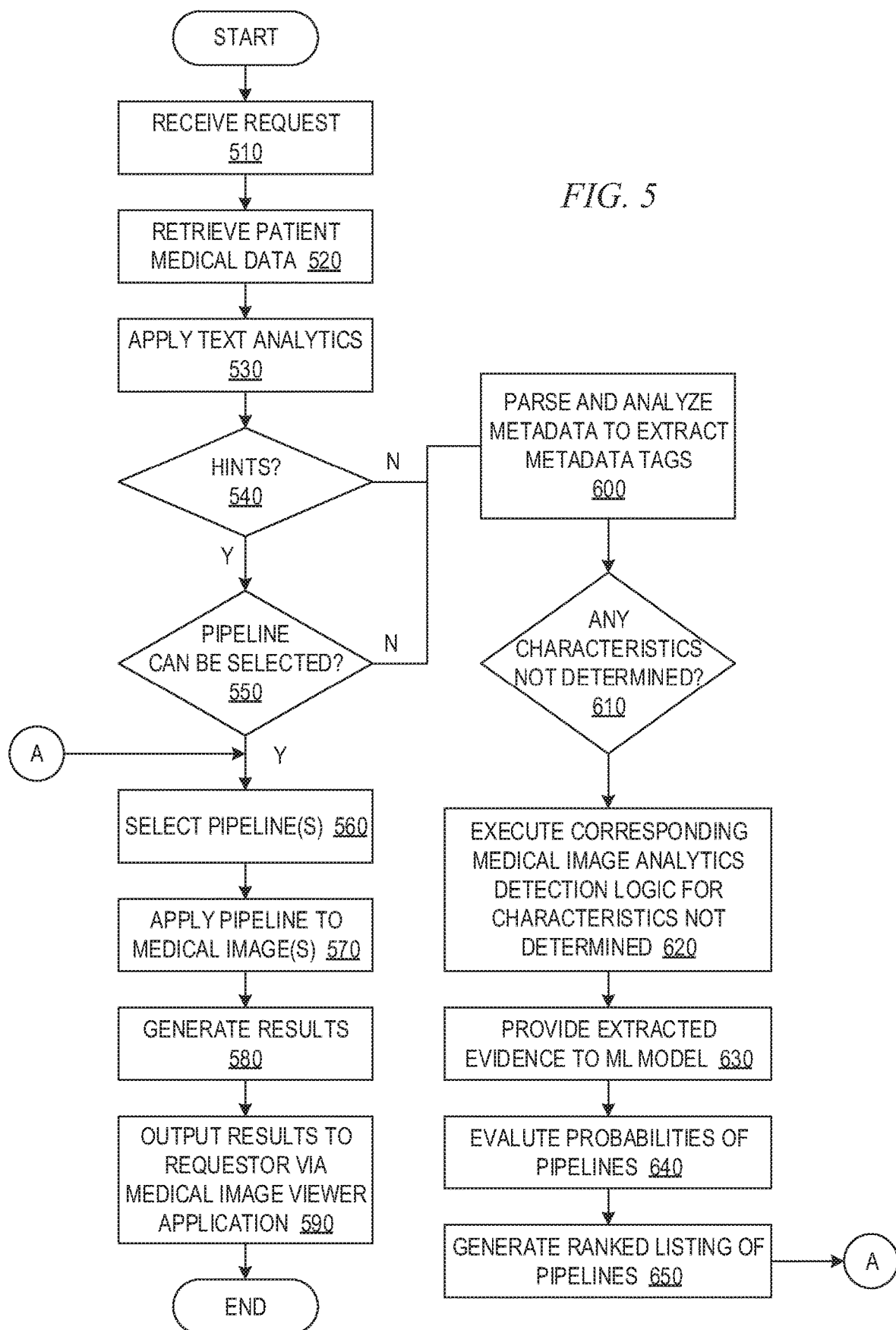
FIG. 5 is a flowchart outlining an example operation for automatically identifying a medical image processing pipeline to apply to a medical image in accordance with one illustrative embodiment.

FIG. 5 is a flowchart outlining an example operation for automatically identifying a medical image processing pipeline to apply to a medical image in accordance with one illustrative embodiment. As shown in FIG. 5, the operation starts by receiving a request to access patient medical data (step 510). Patient medical data, including medical image data, is retrieved from a case delivery system (step 520). Textual analytics are applied to text of the medical data (step 530) to determine if there are any hints in the text as to the medical image processing pipeline(s) to be applied to the medical image data (step 540). For example, the textual analytics determine if there any hints as to the diseases that may be represented in the medical image data, such as may be specified in medical image reports accompanying the medical image data, for example. For purposes of illustration, it will be assumed that the determination is to determine if there are any hints as to a disease identification in the medical image data, although it should be appreciated that other criteria for selecting a medical image processing pipeline may also be used without departing from the spirit and scope of the present invention.

If there are hints in the text as determined from the evidence extracted by the textual analytics, a determination is made as to whether a specific medical image processing pipeline can be selected, e.g., a specific disease identification is indicated in the hints in the evidence extracted by the textual analytics (step 550). If the hints are sufficient to identify one or more particular processing pipeline(s), then the corresponding processing pipeline is selected (step 560) and applied to the medical image data (step 570) to generate results (step 580) which are output to the requestor via a medical image viewer application or the like (step 590). If the evidence extracted by the text analytics does not include any hints (step 540) or the hints are insufficient to identify a medical image processing pipeline to be selected (step 550), then the metadata associated with the medical images is parsed and analyzed to extract metadata tags indicative of one or more characteristics of the medical image data (step 600). A determination is then made as to whether any of the characteristics of the medical image data cannot be determined from the processing of the text and metadata (step 610). For those characteristics that cannot be determined from the processing of the text and metadata, corresponding detection logic of a medical image analytics are applied to the medical image data to extract evidence features of the medical image that indicate the corresponding characteristic (step 620).

The extracted evidence from the text, the metadata, and the medical image features is input to a machine learning model (step 630), which evaluate the probability of each of a plurality of medical image processing pipelines as being an appropriate medical image processing pipeline for the retrieved medical image(s) in the retrieved medical data for the patient (step 640). A ranked listing of the pipelines is generated (step 650) and one or more of the pipelines are selected (step 560) and applied to the medical image data (step 570) to generate results (step 580) which are output to the requestor via a medical image viewer application or the like (step 590). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to cause the at least one processor to implement an automated medical image processing pipeline selection system, and wherein the method comprises:

receiving, by the automated medical image processing pipeline selection system, medical image data associated with a patient electronic medical record, wherein the medical image data comprises one or more medical images and corresponding text data, and wherein the text data comprises a medical imaging report referencing the one or more medical images;

analyzing, by a medical image analytics subsystem of the automated medical processing pipeline, the medical image data to extract first evidence data comprising characteristics of the one or more medical images in the medical image data indicative of a medical image processing pipeline to select for processing the one or more medical images;

providing the first evidence data to a machine learning model of the automated medical image processing pipeline selection engine;

selecting, by the machine learning model, a medical image processing pipeline based on a machine learning based analysis of the first evidence data;

processing, by the selected medical image processing pipeline, the medical image data to generate a results output;

analyzing, by a text analytics subsystem of the automated medical image processing pipeline selection system, the text data to extract second evidence data; and determining, by the text analytics subsystem, whether the second evidence comprises hint text indicating a medical image processing pipeline to select for processing the medical image data, wherein in response to the text data not comprising hint text indicating a medical image processing pipeline to select, the machine learning model selects the medical image processing pipeline based on machine learning based analysis of both the first evidence data and the second evidence data.

2. The method of claim 1, wherein the medical image analytics subsystem comprises a metadata parser and analytic subsystem that parses and analyzes metadata associated with the one or more medical images to determine characteristics of the one or more medical images specified in the metadata.

3. The method of claim 1, wherein the medical image analytics subsystem comprises medical image analysis logic that analyzes graphical characteristics of the one or more medical images to determine characteristics of the one or more medical images.

4. The method of claim 1, wherein the characteristics of the one or more medical images comprise at least one of image dimensionality, image modality, image modality mode, image modality view, imaging body part, imaging anatomical structure, targeted disease, or targeted abnormality.

5. The method of claim 1, wherein, in response to the second evidence data comprising hint text indicating a medical image processing pipeline to select for processing the medical image data, the indicated medical image processing pipeline is selected.

6. The method of claim 1, wherein selecting, by the machine learning model, a medical image processing pipeline based on a machine learning based analysis of the first evidence data comprises automatically generating a new medical image processing pipeline based on the machine learning based analysis, wherein the new medical image processing pipeline comprises a plurality of medical image analysis algorithms selected from a collection of medical image analysis algorithms.

7. The method of claim 6, wherein the plurality of medical image analysis algorithms comprise at least one of a segmentation analysis algorithm, a registration analysis algorithm, a classification analysis algorithm, an abnormality detection algorithm, or a disease detection algorithm.

8. The method of claim 1, wherein the selected medical image processing pipeline is selected from a collection of medical image processing pipelines, and wherein each medical image processing pipeline comprises a differently configured plurality of medical image analysis algorithms, and wherein, for each of the medical image processing pipelines in the collection of medical image processing pipelines, a corresponding plurality of medical image analysis algorithms comprise at least one of a segmentation analysis algorithm, a registration analysis algorithm, a classification analysis algorithm, an abnormality detection algorithm, or a disease detection algorithm.

9. A computer program product comprising a computer readable storage medium having a computer readable program stored therein, wherein the computer readable program, when executed on a data processing system, causes the data processing system to implement an automated medical image processing pipeline selection system, and wherein the computer readable program further causes the data processing system to:

receive, by the automated medical image processing pipeline selection system, medical image data associated with a patient electronic medical record, wherein the medical image data comprises one or more medical images and corresponding text data, wherein the text data comprises a medical imaging report referencing the one or more medical images;

analyze, by a medical image analytics subsystem of the automated medical processing pipeline, the medical image data to extract first evidence data comprising characteristics of the one or more medical images in the medical image data indicative of a medical image processing pipeline to select for processing the one or more medical images;

provide the first evidence data to a machine learning model of the automated medical image processing pipeline selection engine;

select, by the machine learning model, a medical image processing pipeline based on a machine learning based analysis of the first evidence data;

process, by the selected medical image processing pipeline, the medical image data to generate a results output;

analyze, by a text analytics subsystem of the automated medical image processing pipeline selection system, the text data to extract second evidence data; and determine, by the text analytics subsystem, whether the second evidence comprises hint text indicating a medical image processing pipeline to select for processing the medical image data, wherein in response to the text data not comprising hint text indicating a medical image processing pipeline to select, the machine learning model selects the medical image processing pipeline based on machine learning based analysis of both the first evidence data and the second evidence data.

10. The computer program product of claim 9, wherein, in response to the second evidence data comprising hint text indicating a medical image processing pipeline to select for processing the medical image data, the indicated medical image processing pipeline is selected.

11. The computer program product of claim 9, wherein the medical image analytics subsystem comprises a metadata parser and analytic subsystem that parses and analyzes metadata associated with the one or more medical images to determine characteristics of the one or more medical images specified in the metadata.

12. The computer program product of claim 9, wherein the medical image analytics subsystem comprises medical image analysis logic that analyzes graphical characteristics of the one or more medical images to determine characteristics of the one or more medical images.

13. The computer program product of claim 9, wherein the characteristics of the one or more medical images comprise at least one of image dimensionality, image modality, image modality mode, image modality view, imaging body part, imaging anatomical structure, targeted disease, or targeted abnormality.

14. The computer program product of claim 9, wherein the computer readable program further causes the data processing system to select, by the machine learning model, a medical image processing pipeline based on a machine learning based analysis of the first evidence data at least by automatically generating a new medical image processing pipeline based on the machine learning based analysis, wherein the new medical image processing pipeline comprises a plurality of medical image analysis algorithms selected from a collection of medical image analysis algorithms.

15. The computer program product of claim 14, wherein the plurality of medical image analysis algorithms comprise at least one of a segmentation analysis algorithm, a registration analysis algorithm, a classification analysis algorithm, an abnormality detection algorithm, or a disease detection algorithm.

16. A data processing system comprising:
    at least one processor; and
    at least one memory coupled to the at least one processor, wherein the at least one memory comprises instructions which, when executed by the at least one processor, cause the at least one processor to implement an automated medical image processing pipeline selection system, and wherein the instructions further cause the at least one processor to:
    receive, by the automated medical image processing pipeline selection system, medical image data associated with a patient electronic medical record, wherein the medical image data comprises one or more medical images and corresponding text data, wherein the text data comprises a medical imaging report referencing the one or more medical images;
    analyze, by a medical image analytics subsystem of the automated medical processing pipeline, the medical image data to extract first evidence data comprising characteristics of the one or more medical images in the medical image data indicative of a medical image processing pipeline to select for processing the one or more medical images;
    provide the first evidence data to a machine learning model of the automated medical image processing pipeline selection engine;
    select, by the machine learning model, a medical image processing pipeline based on a machine learning based analysis of the first evidence data;
    process, by the selected medical image processing pipeline, the medical image data to generate a results output;
    analyze, by a text analytics subsystem of the automated medical image processing pipeline selection system, the text data to extract second evidence data; and
    determine, by the text analytics subsystem, whether the second evidence comprises hint text indicating a medical image processing pipeline to select for processing the medical image data, wherein in response to the text data not comprising hint text indicating a medical image processing pipeline to select, the machine learning model selects the medical image processing pipeline based on machine learning based analysis of both the first evidence data and the second evidence data.

17. A method, in a data processing system comprising at least one processor and at least one memory, wherein the at least one memory comprises instructions that are executed by the at least one processor to cause the at least one processor to implement an automated medical image processing pipeline selection system, and wherein the method comprises:
    receiving, by the automated medical image processing pipeline selection system, medical image data and text data associated with a patient electronic medical record;
    analyzing, by a text analytics subsystem of the automated medical image processing pipeline selection system, the text data to extract first evidence and to determine whether the first evidence comprises hint text indicating a medical image processing pipeline to select for processing the medical image data;
    in response to the text data not comprising hint text indicating a medical image processing pipeline to select, extracting, by a medical image analytics subsystem of the automated medical image processing pipeline selection system, second evidence comprising characteristics of one or more medical images in the medical image data indicative of a medical image processing pipeline to select;
    providing the first evidence and second evidence to a machine learning model of the automated medical image processing pipeline selection engine;
    selecting, by the machine learning model, a medical image processing pipeline based on a machine learning based analysis of the first evidence and the second evidence; and
    applying, by the automated medical image processing pipeline selection system, the selected medical image processing pipeline to the medical image data to generate a results output.

18. The method of claim 17, wherein the medical image analytics subsystem comprises:
    a metadata parser and analytic subsystem that parses and analyzes metadata associated with the one or more medical images to determine characteristics of the one or more medical images specified in the metadata; and
    medical image analysis logic that analyzes graphical characteristics of the one or more medical images to determine characteristics of the one or more medical images.

19. The method of claim 17, wherein the characteristics of the one or more medical images comprise at least one of image dimensionality, image modality, image modality mode, image modality view, imaging body part, imaging anatomical structure, targeted disease, or targeted abnormality.

20. The method of claim 17, wherein analyzing the text data to extract first evidence and to determine whether the first evidence comprises hint text indicating a medical image processing pipeline to select for processing the medical image data further comprises:
    extracting portions of text from the text data specifying one or more medical concepts;
    performing an expansion operation on the one or more medical concepts to expand the one or more medical concepts to include at least one of synonyms or other medical concepts related to the one or more medical concepts;
    performing a knowledge retrieval operation that retrieves assertions from a knowledge base corresponding to the one or more medical concepts; and
    performing a probabilistic scoring of medical image processing pipelines based on the retrieved assertions.

21. A computer program product comprising a computer readable storage medium having a computer readable program stored therein, wherein the computer readable program, when executed on a data processing system, causes the data processing system to implement an automated medical image processing pipeline selection system, and wherein the computer readable program further causes the data processing system to:
    receive, by the automated medical image processing pipeline selection system, medical image data and text data associated with a patient electronic medical record;
    analyze, by a text analytics subsystem of the automated medical image processing pipeline selection system, the text data to extract first evidence and to determine whether the first evidence comprises hint text indicating a medical image processing pipeline to select for processing the medical image data;

in response to the text data not comprising hint text indicating a medical image processing pipeline to select, extract, by a medical image analytics subsystem of the automated medical image processing pipeline selection system, second evidence comprising characteristics of one or more medical images in the medical image data indicative of a medical image processing pipeline to select;

provide the first evidence and second evidence to a machine learning model of the automated medical image processing pipeline selection engine;

select, by the machine learning model, a medical image processing pipeline based on a machine learning based analysis of the first evidence and the second evidence; and apply, by the automated medical image processing pipeline selection system, the selected medical image processing pipeline to the medical image data to generate a results output.

\* \* \* \* \*